United States Patent Office 3,508,492
Patented Apr. 28, 1970

3,508,492
DYE FOIL FOR THE PRODUCTION OF PRINTS BY MEANS OF HEAT
Heinrich Seibert and Werner Krafft, Leverkusen, Germany, assignors to Agfa-Gevaert Aktiengesellschaft, Leverkusen, Germany, a corporation of Germany
No Drawing. Filed Mar. 13, 1967, Ser. No. 622,449
Claims priority, application Germany, Apr. 9, 1966, A 52,120
Int. Cl. B41m 5/18
U.S. Cl. 101—470                 10 Claims

ABSTRACT OF THE DISCLOSURE

Sublimable dyes such as C.I. Nos. 64500, 62035, 11110, 11345 and 2882, di-isobutylamino-anthraquinone and 1,5-di-hydroxy-4,8-stearylamino-anthraquinone are incorporated into a copolymer of 20–40% acrylonitrile and 60–80% styrene, which copolymer can be blended with a butadiene-acrylonitrile copolymer or a copolymer of styrene and acrylonitrile grafted onto polybutadiene or onto copolymers of butadiene with styrene and/or acrylonitrile. The sublimable dyes in the resin binder are formed into a relief layer and the dye transferred from said relief layer by heating and sublimation to a sheet to be printed.

---

The present invention relates to a dye foil which contains sublimable dyes and which is suitable for use in the production of printing forms for the heat printing process.

In the already known heat printing processes prints may be obtained by heating a printing form which contains meltable or sublimable dyes. When such a printing form is heated, the dye is transferred image-wise to or final support. This printing process is extremely simple, but possesses the difficulties that, in the production of suitable layers for containing the dyes, the binder has to meet very special requirements. For this reason, the process is of limited utility in spite of its advantages.

In the above mentioned process, mainly the dye is transferred to the final support in the course of the printing process whilst the binder is transferred only to a slight extent.

In the processes for producing printing forms, a sheet of paper which is to serve as the final support is usually arranged between the written side of the original and the dye layer of the dye foil. These three materials are in close contact with each other and exposure takes place by means of reflected infra-red radiation which passes through the support of the dye foil. The materials are subsequently separated so that parts of the dye layer which correspond to the writing on the original are torn out and thereby transferred to the final support. Processes based on this principle are described in German patent specification No. 916,413. In such a case alcohol-soluble dyes are used in the dye layer so that the resulting printing forms can be used in the spirit printing process.

In the foregoing processes different apparatuses are required for the production of the printing forms and for their use.

The object of the invetnion is to provide dye foils, the dyed layers of which contain dyes capable of being sublimated on heating, and which are suitable for use in the production of printing forms for heat printing, both mechanically, e.g. by writing by hand or with a typewriter, or photographically in an infra-red radiation apparatus by reflected light or transmitted light by the process mentioned above, but, in which, in contrast to the known process, the same apparatus can be used both for the production of the photographic printing form and for the printing process.

We now have found that for the production of printing forms for heat printing, dyed layers are suitable which contain dyes sublimable above 140° C., preferably between 140° C. and 180° C. dispersed in a binder which consists substantially of mixtures of (I) relatively hard copolymers of styrene and acrylonitrile and (II) a relatively soft, rubber-like component consisting of copolymers of butadiene and acrylonitrile and/or styrene.

The mixture obtained should contain about 40 to 80% by weight of component (I) and about 20 to 60% by weight of component (II). This mixture preferably contains a total of about 10 to 35% by weight of acrylonitrile, 40 to 70% by weight of styrene and 10 to 35% by weight of butadiene, all in the polymerised form.

Particularly suitable are mixtures which have an overall composition of 18 to 28% by weight acrylonitrile, 50 to 65% by weight of styrene and 12 to 32% by weight of butadiene.

Component (I) contains, in polymerised form, 20 to 40% by weight, and preferably about 30% by weight, of acrylonitrile and 60 to 80% by weight and preferably about 70% by weight of styrene.

Component (II) may consist either of pure copolymers e.g. of butadiene and acrylonitrile, or, preferably, of graft copolymers of acrylonitrile and styrene preferably those having the composition of component (I) grafted onto polybutadiene or onto copolymers of butadiene and styrene and/or acrylonitrile. Component (II) of the mixture should contain about 40 to 80% by weight of butadiene in the polymerised form. The above binders are distinguished by the fact that they soften within the temperature region of about 140 to 180° C. without becoming tacky.

The polymeric components mentioned above are produced by the usual processes. Suitable processes for their production are given in German Patents Nos. 839,856; 840,152; 892,827 and 829,217 and in U.S. Patents Nos. 2,439,202; 2,498,652; 2,505,349; 2,550,139; 2,597,951 and 2,600,024.

The following are examples of suitable dyes.

(1) Dispersion dyes:
  Celliton Blue G—Colour Index 64500
  Celliton Blue FFB—Colour Index 62035
  Celliton Scarlet B—Colour Index 11110
  Celliton Light Yellow RR—Colour Index 11345
  Resolin Yellow RL
  Resolin Red FB
  Resolin Blue RRL (2) Benzine-soluble dyes:
  Aminoanthraquinones and hydroxyanthraquinones with relatively long side chains, such as Benzin Blue=1,4 - di - isobutylamino - anthraquinone, 1,5-di-isobutylamino-anthraquinone, 1,5-di-hydroxy-4,8-stearylamino-anthraquinone; Sudan Blue II (Color Index 2882).

Preferred are anthraquinone dyes which contain alkyl-amino groups, the alkyl group of which has up to 8 carbon atoms, for example, the Benzin Blue dyes mentioned above.

These dyes are added in concentrations of preferably 30 to 70% by weight, based on the dry layer.

When the layers according to the invention are used in the production of printing forms, it has been found particularly advantageous to add to the layers plasticisers or other substances which loosen the cohesion within the layer. This facilitates tearing out of parts of the layer in the production of printing forms, with the result that shaper relief images are obtained. Suitable additives of this type are, for example, plasticizers such as esters of adipic acid, e.g., glycol adipic acid, polyesters, esters of phthalic acid, for example, dioctylphthalic acid esters or stearic or dihydroxy-stearic acid, and esters of phosphoric acid such as tricresyl phosphates. A similar effect is also obtained by using derivatives of naphthalene sulphonic acid, polyvalent alcohols such as ethylene glycol, glycerol, pentaerythritol as well as polyethers, e.g., polyglycols, and in particular polyethylene oxides which have been etherified at the end groups, for example, the reaction products of nonyl alcohol and ethylene oxide.

Synthetic resins such as polymers or copolymers of ethylene and vinyl acetates have also been found to be suitable for this purpose.

It has also been found advantageous to influence the adhesion of the dyed layer to the support in the desired manner by the use of suitable additives. It may, for example, be necessary to improve the adhesion of the dye-containing layer to certain transparent foils, for example, foils of polycarbonate or polyesters, in particular those based on polyethylene glycol terephthalates, by the addition of other synthetic polymers, such as polyvinyl acetate in small quantities, e.g. 1 to 2%. In some cases, it has proved advantageous to add inorganic fillers, such as finely divided silicic acid, aluminium oxide or titanium oxide.

The layers used in the process according to the invention are produced in the usual manner by first dissolving the binder and the usual components in suitable solvents such as methyl ethyl ketones, cyclohexanone or methyl glycol acetates and then, if desired, adding the dye and carefully homogenising, for example, with the use of a 3-roller mill. The dye is then present substantially in the form of a heterogeneous dispersion.

The composition when ready for casting is then applied to suitable supports by the use of suitable means such as wipers.

Particularly suitable materials for use as the supports are paper supports such as electrically insulating papers, pigmented papers, especially those of dense quality, raw carbon papers, chrome papers or the commonly used baryta papers. The layers to be used in the process according to the invention may, of course, also be applied to other supports, whereby the adhesion between the dyed layer and the support is relatively small, thus ensuring that areas corresponding to the image will be torn out to produce the printing form. The main requirement to be met by the support is that it should have a relatively smooth surface and be heat resistant in the temperature region of 140 to 180° C. required for the process. The finished layers preferably have a thickness of about 10 to 20μ, preferably about 14 to 16μ.

The usual processes may be used for the production of printing forms using the dye foils according to the invention. In the simplest and most common case, the forms can be produced by means of a typewriter, whereby the information required is typed onto the sheet which is to serve as the support for the relief layer, this sheet having the layer according to the invention placed behind it during the typing. According to a preferred embodiment, the printing form is produced by image-wise exposure, the sheet of paper which serves as final carrier for the relief layer, being arranged between the original and the layer according to the invention and subsequently exposed in the usual manner, for example, to reflected infrared radiation. In this process, the parts of the layer according to the invention which correspond to the writing on the original are torn out and transferred to the sheet of paper. A relief image is obtained which is suitable for use as a printing form for the heat printing process.

In this process, it has been found advantageous to pre-heat the layers according to the invention to a certain temperature, for example, of up to 120° C., so that the parts can then be torn out of the layer by a relatively slight increase in temperature. The exposure to form the image should be as intensive and as short as possible in order to prevent conduction away of heat, which would render the relief image less sharp.

EXAMPLE 1

Preparation of the dyed layer 30 parts by weight of a binder consisting of 65 parts of a copolymer of acrylonitrile and styrene (30:70) and 35 parts of a graft polymer of styrene-acrylonitrile and butadiene (copolymers of 35 parts of styrene and 15 parts of acrylonitrile grafted onto 50 parts of polybutadiene), 30 parts of a copolymer of ethylene and vinyl acetate dissolved in methyl ethyl ketones, and 100 parts of a plasticizer based on nonyl alcohol polyethylene oxide are dissolved in 60 parts of cyclohexanone at 40–50° C. with stirring. After cooling, 260 parts of Benzin Blue are added. This is then homogenized twice in a 3-roller mill.

The composition when ready for casting is applied to an electrically insulating paper by means of a doctor blade. The thickness of the layer is about 15μ.

Processing

A printing form is prepared in the usual way using a typewriter. The finished printing form is conducted over a heated roller together with the material on which the image is to be printed, the sublimable dye being partly transferred to the final support during this operation. A clear copy of the original is obtained. Up to 200 prints of excellent quality can be produced from the above printing form.

EXAMPLE 2

40 parts by weight of the binder described in Example 1, 10 parts of a copolymer of ethylene and vinyl acetate (1:1), 100 parts of a plasticizer based on polyethylene oxide (reaction product of nonyl alcohol and ethylene oxide), 50 parts of a polyester of ethylene glycol and adipic acid and 300 parts of Benzin Blue are worked up to form a color layer in the manner described in Example 1. Production of the printing forms and the use of the forms are carried out as indicated in Example 1.

What is claimed is:

1. The process comprising heating in contact with a sheet to be printed, a printing form having an image relief layer with a sublimable dye dispersed in said layer, which layer contains as a binder a mixture consisting essentially of (I) a copolymer containing 20 to 40% by weight acrylonitrile and 60 to 80% by weight styrene and (II) a graft polymer of a copolymer of acrylonitrile and styrene grafted onto
   (a) polybutadiene,
   (b) a copolymer of butadiene, acrylonitrile and styrene,
   (c) a copolymer of butadiene and acrylonitrile or
   (d) a copolymer of butadiene and styrene.

2. The process as defined in claim 1 wherein component (II) contains 40–80% by weight of butadiene.

3. The process as defined in claim 1 wherein the sublimable dye sublimes at a temperature between 140 and 180° C.

4. A printing form consisting essentially of a supported image relief layer on a support, said relief layer containing a sublimable dye dispersed in a binding agent consisting essentially of a mixture of a copolymer containing 20 to 40% by weight of acrylonitrile and 60 to 80% by weight of styrene and a graft polymer of a copolymer of acrylonitrile and styrene grafted onto
   (a) polybutadiene,
   (b) a copolymer of butadiene, acrylonitrile and styrene,
   (c) a copolymer of butadiene and acrylonitrile or
   (d) a copolymer of butadiene and styrene.

5. The printing form as defined in claim 4 wherein the component contains 40–80% by weight of butadiene.

6. The printing form as defined in claim 4 wherein the sublimable dye sublimes at a temperature between 140 and 180° C.

7. A dye sheet for the production of printing forms comprising a support and a dye layer thereon containing a sublimable dye dispersed in a binding agent consisting essentially of a mixture of: (I) a copolymer containing 20 to 40% by weight of acrylonitrile and 60 to 80% by weight of styrene and (II) a graft polymer of a copolymer of acrylonitrile and styrene grafted onto
   (a) polybutadiene,
   (b) a copolymer of butadiene, acrylonitrile and styrene,
   (c) a copolymer of butadiene and acrylonitrile or
   (d) a copolymer of butadiene and styrene.

8. The dye sheet as defined in claim 7 wherein component (II) contains 40–80% by weight of butadiene.

9. The dye sheet as defined in claim 7 wherein the sublimable dye sublimes at a temperature between 140 and 180° C.

10. The process comprising heating in contact with a sheet to be printed, a printed form having an image relief layer with a sublimable dye dispersed in said layer, which layer contains as a binder a mixture having a softening range of 140° to 180° C. and being non-tacky in that softening range and consisting essentially of:

(I) a copolymer of acrylonitrile and styrene and component;
(II) a graft polymer of a copolymer of acrylonitrile and styrene grafted onto
   (a) polybutadiene;
   (b) a copolymer of butadiene, acrylonitrile and styrene;
   (c) a copolymer of butadiene and acrylonitrile or
   (d) a copolymer of butadiene and styrene.

References Cited

UNITED STATES PATENTS 3,159,592  12/1964  McHugh _____ 260—23.7
3,363,557  1/1968   Blake _____ 101—470

DONALD LEVY, Primary Examiner

U.S. Cl. X.R.

8—2; 96—36.3; 117—36.1; 101—473; 260—41, 41.5; 250—65